US008210429B1

(12) United States Patent
Bohen et al.

(10) Patent No.: US 8,210,429 B1
(45) Date of Patent: Jul. 3, 2012

(54) ON DEMAND TRANSPORTATION FOR CASH HANDLING DEVICE

(75) Inventors: Daniel Christopher Bohen, Charlotte, NC (US); Amy Baker Folk, Charlotte, NC (US); William Thomas Sanders, Denver, NC (US); Shane Anthony Johnson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 809 days.

(21) Appl. No.: 12/262,659

(22) Filed: Oct. 31, 2008

(51) Int. Cl.
*G06F 19/00* (2006.01)

(52) U.S. Cl. .......................... 235/385; 235/379

(58) Field of Classification Search .............. 235/379, 235/385

See application file for complete search history.

(56) References Cited

U.S. PATENT DOCUMENTS

| 3,618,059 | A | 11/1971 | Allen |
| 4,352,097 | A | 9/1982 | Hamann |
| 4,443,692 | A | 4/1984 | Nishimura |
| 4,992,648 | A | 2/1991 | Hutchison et al. |
| 5,453,601 | A | 9/1995 | Rosen |
| 5,533,605 | A | 7/1996 | Mays et al. |
| 5,561,281 | A | 10/1996 | Eda et al. |
| 5,689,240 | A | 11/1997 | Traxler |
| 5,748,906 | A | 5/1998 | Sandig |
| 5,748,908 | A | 5/1998 | Yu |
| 5,900,607 | A | 5/1999 | Awatsue et al. |
| 5,952,920 | A | 9/1999 | Braddick |
| 5,953,423 | A | 9/1999 | Rosen |
| 5,963,131 | A | 10/1999 | D'Angelo et al. |
| 6,028,517 | A | 2/2000 | Sansone et al. |
| 6,047,807 | A | 4/2000 | Molbak |
| 6,055,438 | A | 4/2000 | Winner, Jr. |
| 6,122,625 | A | 9/2000 | Rosen |
| 6,167,378 | A | 12/2000 | Webber, Jr. |
| 6,378,770 | B1 | 4/2002 | Clark et al. |
| 6,483,433 | B2 | 11/2002 | Moskowitz et al. |
| 6,487,542 | B2 | 11/2002 | Ebata et al. |
| 6,491,216 | B1 | 12/2002 | May |
| 6,498,603 | B1 | 12/2002 | Wallace |
| 6,502,746 | B1 | 1/2003 | Do et al. |
| 6,523,742 | B1 | 2/2003 | Awatsue et al. |
| 6,526,273 | B1 | 2/2003 | Link, II et al. |
| 6,633,881 | B2 | 10/2003 | Drobish et al. |

(Continued)

FOREIGN PATENT DOCUMENTS

DE 4019265 11/1991

(Continued)

OTHER PUBLICATIONS

Powerpoint Presentation, DTS Product Overview, IFS, Apr. 2006, 17 pages.

(Continued)

*Primary Examiner* — Karl D Frech
(74) *Attorney, Agent, or Firm* — Banner & Witcoff, Ltd.; Michael A. Springs (57) ABSTRACT

Methods and devices enable inventory levels to be monitored in one or more cash handling devices. A cash handling device may be stocked with inventory. Deposits to and withdrawals from the cash handling device may be made. Changes in the inventory due to the deposits and the withdrawals may be monitored. Armored service for transport may be dispatched when: 1) the cash handling device requires replenishment for one or more denominations, 2) the inventory rises above or falls below desired thresholds, and/or 3) is approaching maximum capacity for one or more denominations. The inventory in the cash handling device may then be adjusted.

13 Claims, 5 Drawing Sheets

U.S. PATENT DOCUMENTS

| | | |
|---|---|---|
| 6,736,314 B2 | 5/2004 | Cooper et al. |
| 6,788,203 B1 | 9/2004 | Roxbury et al. |
| 6,845,905 B2 | 1/2005 | Blad et al. |
| 7,004,385 B1 | 2/2006 | Douglass |
| 7,042,360 B2 | 5/2006 | Light et al. |
| 7,076,458 B2 | 7/2006 | Lawlor et al. |
| 7,201,313 B1 | 4/2007 | Ramachandran |
| 7,212,992 B1 | 5/2007 | Kanevsky et al. |
| 7,216,800 B1 | 5/2007 | Ramachandran |
| 7,243,080 B2 | 7/2007 | Bhadra |
| 7,248,160 B2 | 7/2007 | Mangan et al. |
| 7,284,692 B1 | 10/2007 | Douglass |
| 7,348,886 B2 | 3/2008 | Himberger et al. |
| 7,350,230 B2 | 3/2008 | Forrest |
| 7,375,638 B2 | 5/2008 | Light et al. |
| 7,461,780 B2 | 12/2008 | Potts et al. |
| 7,474,217 B2 | 1/2009 | Himberger et al. |
| 7,577,612 B2 | 8/2009 | Waller et al. |
| 7,588,185 B2 | 9/2009 | Berquist et al. |
| 7,623,033 B2 | 11/2009 | Ainsworth et al. |
| 7,659,816 B2 | 2/2010 | Wandel |
| 7,714,708 B2 | 5/2010 | Brackmann et al. |
| 7,719,423 B2 | 5/2010 | Himberger et al. |
| 7,748,610 B2 | 7/2010 | Bell et al. |
| 2001/0051922 A1 | 12/2001 | Waller et al. |
| 2001/0054643 A1 | 12/2001 | Siemens |
| 2002/0052193 A1 | 5/2002 | Chetty |
| 2002/0052794 A1 | 5/2002 | Bhadra |
| 2002/0091937 A1 | 7/2002 | Ortiz |
| 2002/0095588 A1 | 7/2002 | Shigematsu et al. |
| 2002/0138424 A1 | 9/2002 | Coyle |
| 2002/0194122 A1 | 12/2002 | Knox et al. |
| 2002/0195309 A1 | 12/2002 | Pope |
| 2003/0011466 A1 | 1/2003 | Samuel et al. |
| 2003/0050891 A1 | 3/2003 | Cohen |
| 2003/0061153 A1 | 3/2003 | Birdsong et al. |
| 2003/0083936 A1 | 5/2003 | Mueller et al. |
| 2003/0122671 A1 | 7/2003 | Jespersen |
| 2003/0163710 A1 | 8/2003 | Ortiz et al. |
| 2003/0177102 A1 | 9/2003 | Robinson |
| 2003/0208431 A1 | 11/2003 | Raynes et al. |
| 2003/0213843 A1 | 11/2003 | Jackson |
| 2003/0234719 A1 | 12/2003 | Denison et al. |
| 2004/0016796 A1 | 1/2004 | Hanna et al. |
| 2004/0056767 A1 | 3/2004 | Porter |
| 2004/0083149 A1 | 4/2004 | Jones |
| 2004/0100379 A1 | 5/2004 | Boman et al. |
| 2004/0111346 A1 | 6/2004 | Macbeath et al. |
| 2004/0124966 A1 | 7/2004 | Forrest |
| 2004/0201454 A1 | 10/2004 | Waterhouse et al. |
| 2005/0091129 A1 | 4/2005 | Tien |
| 2005/0108164 A1 | 5/2005 | Solafia, III et al. |
| 2005/0183928 A1 | 8/2005 | Jones et al. |
| 2005/0258234 A1 | 11/2005 | Silverbrook et al. |
| 2005/0273347 A1 | 12/2005 | Dudley et al. |
| 2006/0120519 A1 | 6/2006 | Tamari et al. |
| 2006/0131395 A1 | 6/2006 | Potts et al. |
| 2006/0247973 A1 | 11/2006 | Mueller et al. |
| 2006/0271441 A1 | 11/2006 | Mueller et al. |
| 2006/0282277 A1 | 12/2006 | Ng |
| 2006/0288233 A1 | 12/2006 | Kozlay |
| 2007/0005452 A1 | 1/2007 | Klingenberg et al. |
| 2007/0008118 A1 | 1/2007 | Kassiedass |
| 2007/0012602 A1 | 1/2007 | Baldassari et al. |
| 2007/0034693 A1 | 2/2007 | Jouvin et al. |
| 2007/0063016 A1 | 3/2007 | Myatt et al. |
| 2007/0174156 A1 | 7/2007 | Emde et al. |
| 2007/0226142 A1 | 9/2007 | Hanna et al. |
| 2007/0282724 A1 | 12/2007 | Barnes et al. |
| 2008/0005019 A1 | 1/2008 | Hansen |
| 2008/0005578 A1 | 1/2008 | Shafir |
| 2008/0103959 A1 | 5/2008 | Carroll et al. |
| 2008/0120237 A1 | 5/2008 | Lin |
| 2008/0149706 A1 | 6/2008 | Brown et al. |
| 2008/0155269 A1 | 6/2008 | Yoshikawa |
| 2008/0199155 A1 | 8/2008 | Hagens et al. |
| 2008/0223930 A1 | 9/2008 | Rolland et al. |
| 2008/0262949 A1 | 10/2008 | Bond et al. |
| 2008/0265019 A1 | 10/2008 | Artino et al. |
| 2008/0303903 A1 | 12/2008 | Bentley et al. |
| 2009/0006249 A1 | 1/2009 | Morgan et al. |
| 2009/0006250 A1 | 1/2009 | Bixler et al. |
| 2009/0032580 A1 | 2/2009 | Blachowicz et al. |
| 2009/0051566 A1 | 2/2009 | Olsen et al. |
| 2009/0051769 A1 | 2/2009 | Kuo et al. |
| 2009/0065573 A1 | 3/2009 | Potts et al. |
| 2009/0107800 A1 | 4/2009 | Nishida et al. |
| 2009/0114716 A1 | 5/2009 | Ramachandran |
| 2009/0164364 A1 | 6/2009 | Galit et al. |
| 2009/0187482 A1 | 7/2009 | Blount et al. |
| 2009/0216662 A1 | 8/2009 | Crist et al. |
| 2010/0052844 A1 | 3/2010 | Wesby |
| 2010/0274723 A1 | 10/2010 | Joab |

FOREIGN PATENT DOCUMENTS

| | | |
|---|---|---|
| DE | 4429815 | 2/1996 |
| DE | 19512045 | 10/1996 |
| DE | 19846452 | 12/1999 |
| DE | 20013021 | 11/2000 |
| DE | 102004039365 | 2/2006 |
| DE | 102005047711 | 4/2007 |
| EP | 1477949 | 11/2004 |
| GB | 2304953 | 3/1997 |
| WO | 9933040 | 7/1999 |
| WO | 03034359 | 4/2003 |
| WO | 2005041385 | 5/2005 |
| WO | 2005106722 | 11/2005 |

OTHER PUBLICATIONS

Durbin, "Ford's F-150 goes high-tech", retrieved from <http://www.wheels.ca/article/173134>, Feb. 6, 2008, 4 pages.

Monthly Minutes from Banking Technology Operations Standing Committee (BTO), dated Mar. 20, 2007, 2 pages.

Hem, "Adaptation/Loomis cashes in on technology/The armored car company defies obsolescence despite a declining use of coins and bills", Houston Chronicle, retrieved from <http://www.chron.com/CDA/archives/archive.mpl?id=2008_4523451>, Mar. 1, 2008, 2 pages.

Powerpoint Presentation, Guck, "Pak Trak", Cash Shipment Package Tracking Concept Overview, Draft-Version 1.0, Mar. 14, 2008, 17 pages.

Powerpoint Presentation, RFID in Banking, May 21, 2008, 12 pages.

Monthly Minutes for RFID SIG dated Mar. 19, 2008, 2 pages.

ON DEMAND TRANSPORTATION FOR CASH HANDLING DEVICE

BACKGROUND

Currently, cash pickups and drop-offs for cash handling devices are performed by an armored carrier on a regularly scheduled basis. Clients may be scheduled for armored carrier service three times per week such as, for example, on Monday, Wednesday, and Friday during an agreed upon window of time. There is little flexibility to change the days and/or times of armored carrier service without harsh financial costs. This model has been sufficient in the past due to the fact that a bagged deposit was prepared by the client each day, and for security and reconciliation purposes it was necessary to have those bags picked up in a timely manner. However, with cash handling devices capable of being connected to a bank network, pre-bagged deposits are no longer required.

Rather, the client may deposit funds directly into the local cash handling device. Upon deposit into the cash handling device, the funds may become the responsibility of the bank. Additionally, the client's corporate operation may immediately access the deposit information to perform reconciliation to daily sales. Because availability of information may be immediate and the money in the cash handling device is secure, there is no longer the need to remove cash from the client location in a timely manner.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In one embodiment, a cash handling device may be stocked with inventory. Deposits to and withdrawals from the cash handling device may be made. Changes in the inventory due to the deposits and the withdrawals may be monitored. Armored service for transport may be dispatched when: 1) the cash handling device requires replenishment for one or more denominations, 2) the inventory rises above or falls below desired thresholds, and/or 3) is approaching maximum capacity for one or more denominations. The inventory in the cash handling device may then be adjusted.

In another embodiment, a cash handling device may be stocked with inventory. Transactions may be allowed at the cash handling device. Changes in the inventory in the cash handling device as a result of the transactions may be monitored. The inventory in the cash handling device may be adjusted such as, for example, to a target level when at least one threshold for the inventory is reached.

In further embodiments, thresholds may be utilized such as, for example, a minimum threshold indicating that at least one denomination is at or below a minimum desired level and/or a maximum threshold indicating that at least one denomination is at or above a maximum desired level.

In yet another embodiment, changes in the inventory may be monitored from a remote location through a communication network.

In an additional embodiment, a plurality of cash handling devices may be stocked with inventory of a plurality of denominations of currency. Deposits to and withdrawals from the cash handling devices may be made. A remote location may monitor changes in the inventory in the cash handling devices as a result of the deposits and the withdrawals. An alert may be issued for one of said plurality of cash handling devices if either a minimum threshold is reached or a maximum threshold is reached, said minimum threshold indicating that at least one of said denominations is at or below a minimum desired level, said maximum threshold indicating that at least one of said denominations is at or above a maximum desired level. A carrier may be dispatched to the cash handling device for which the alert was issued. The carrier may replenish each said currency denomination that is below a target level. In addition, the carrier may withdraw each said currency denomination that is above a target level.

In some embodiments, a coin recycler may be included as part of the cash handling device and may include a coin input opening for receiving coins and a feeding disc to route first coins past a recognition device. The recognition device may determine whether the coins are foreign objects or legitimate coins. The coin recycler may also include an exit to discard foreign objects. A sort mechanism may also store coins in stackers for dispensation. A transport may be included in order to move coins from stackers to an exit when dispensation is required.

In still another embodiment, the cash handling device may be a cash recycler.

In a further embodiment, the cash handling device may be a deposit only machine.

In still further embodiments, one or more steps may be implemented as computer-executable instructions stored on a computer-readable medium.

Additional features and advantages of the invention will be apparent upon reviewing the following detailed description.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, systems and methods are illustrated for enabling inventory levels to be monitored in one or more cash handling devices. Armored service for transport may be dispatched when: 1) the cash handling device requires replenishment for one or more denominations, 2) the inventory rises above or falls below desired thresholds, and/or 3) is approaching maximum capacity for one or more denominations.

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
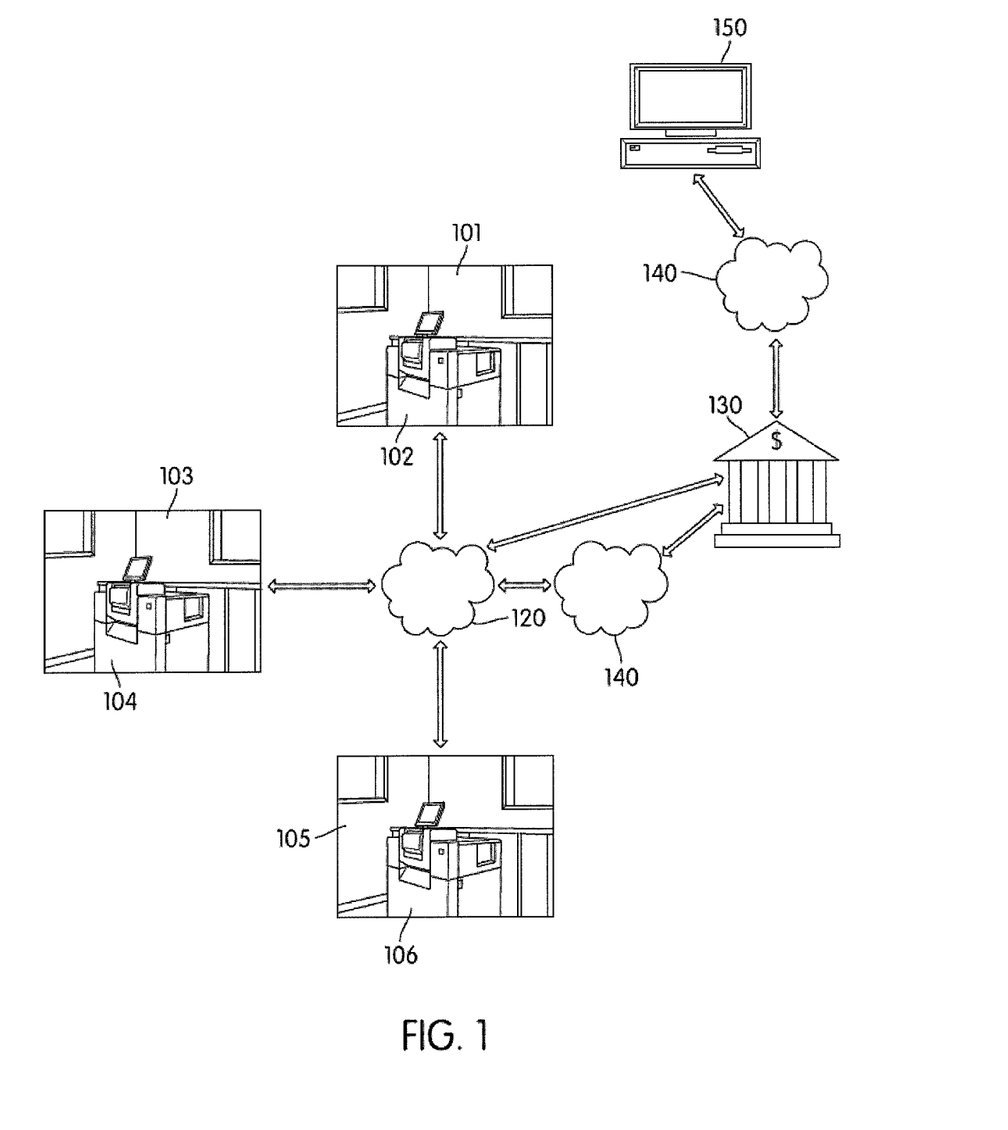
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 such as the STAR network before being connected to bank 130. According to one or more arrangements, bank 130 may utilize an infrastructure which includes a server 150 having components such as a memory, a processor, a display, and a communication interface.

Figure 2:
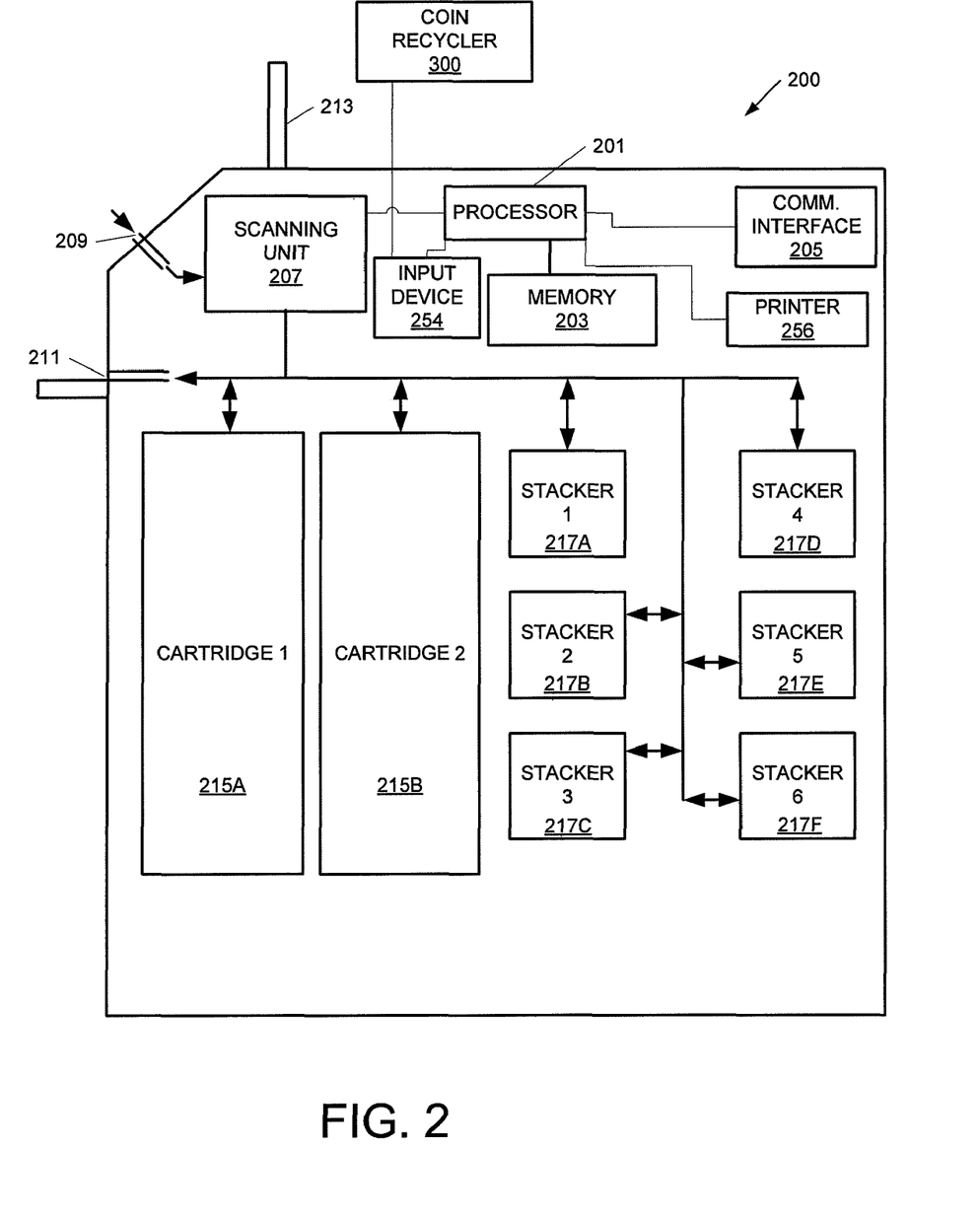
FIG. 2 illustrates a simplified diagram of a cash handling device in accordance with an aspect of the invention.

Cash recycler 200 may further provide display 213 to present data and/or messages to a user. For example, display 213 may be configured to display a recycler balance, a transaction interface, a current deposit count, security options, transportation options and the like.

One or more input devices 254 such as an antenna, serial port, infrared port, Bluetooth module, firewire port, keypad, keyboard, mouse, touchscreen, fingerprint scanner, retinal scanner, proximity card reader, RFID scanner and/or writer, magnetic card reader, barcode reader, and/or combinations thereof may also be included in or connected to recycler 200.

In addition, a coin recycler 300 may also be coupled to the cash handling device 300. The coin recycler 300 may be a stand alone device that is coupled to the cash handling device 300 via one or more of the above-identified input devices 254. This would allow information regarding what coins were deposited into the coin recycler 300 or withdrawn from the coin recycler to be communicated to processor 201 for appropriate crediting, debiting, or other action. In an alternative embodiment, persons of skill in the art will understand that the coin recycler 300 may be integral with and integrated into the cash handling device 200.

One or printers 256 may also be included in or connected to recycler 200 for printing receipts and notifications as well.

In cash recycler 200, stackers 217 and cartridges 215 are configured to store currency. One or more stackers 217 or cartridges 215 may also provide storage for overflow currency such as, for example, a larger quantity of one or more denominations that can be physically stored in its stacker 217 or cartridge 215.

Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be counterfeit. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Preferably, each stacker 217—also known as a recycling module—may be capable of accepting and dispensing a single denomination. Each stacker and any overflow cassette (i.e., for storing overflow quantities of one or more denominations) may be configured with one or more thresholds via a graphical user interface. Example thresholds include, but are not limited to, a minimum, a maximum, and a target. The thresholds may be assigned arbitrarily or by any desired methodology.

A minimum threshold may be, for example, a calculated lower bill quantity threshold for a given denomination. Once the minimum is reached or approached, the client may be in danger of running out of a specific denomination given historical cash usage patterns.

A target threshold may be the ideal bill quantity for a given denomination. This may be the calculated quantity for a given denomination that may minimize transportation runs given module capacity and historical cash usage patterns.

A maximum threshold may be the calculated upper bill quantity threshold for a given denomination. Once the maximum threshold is reached or approached, the client may be in danger of running out of capacity for a specific denomination given module capacity and historical cash usage patterns.

Figure 3A:
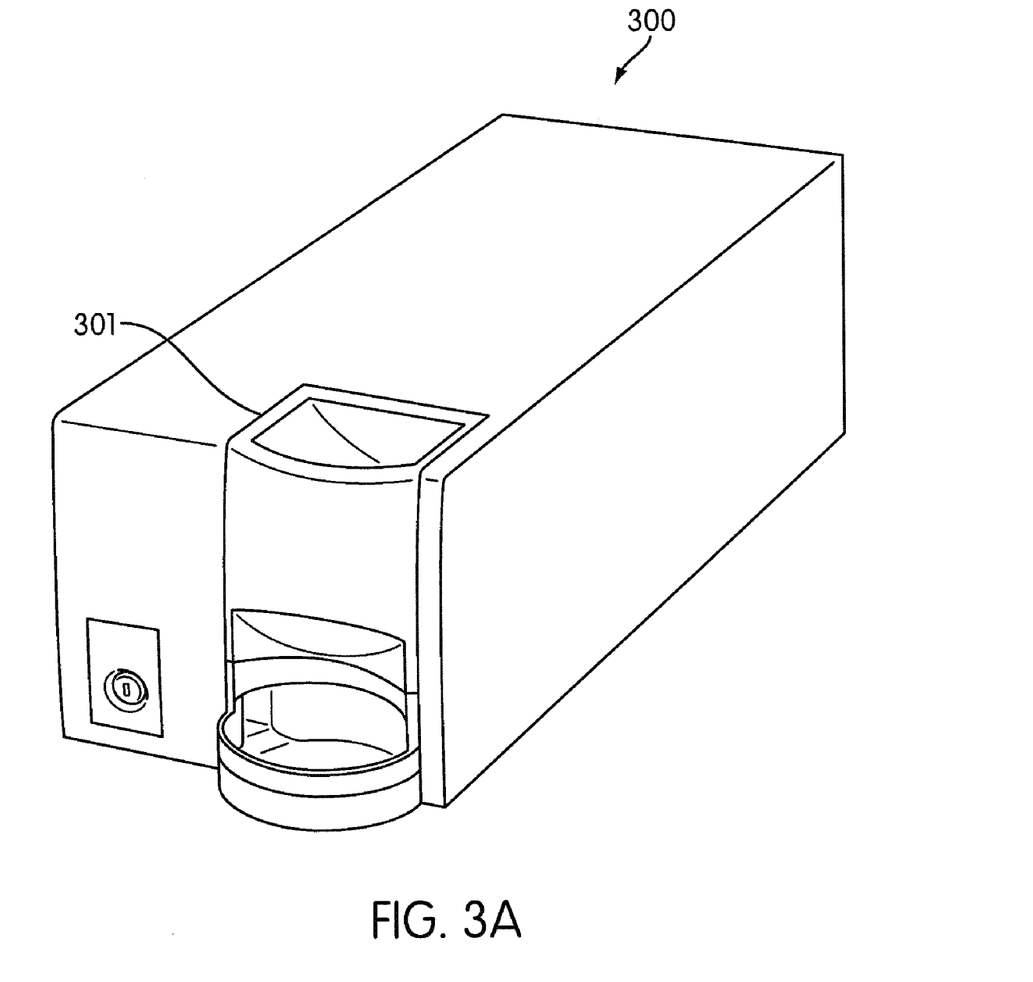
FIG. 3A illustrates an example of a cash recycler that may be used in conjunction with a cash handling device as well as with a point of sale register.
Figure 3B:
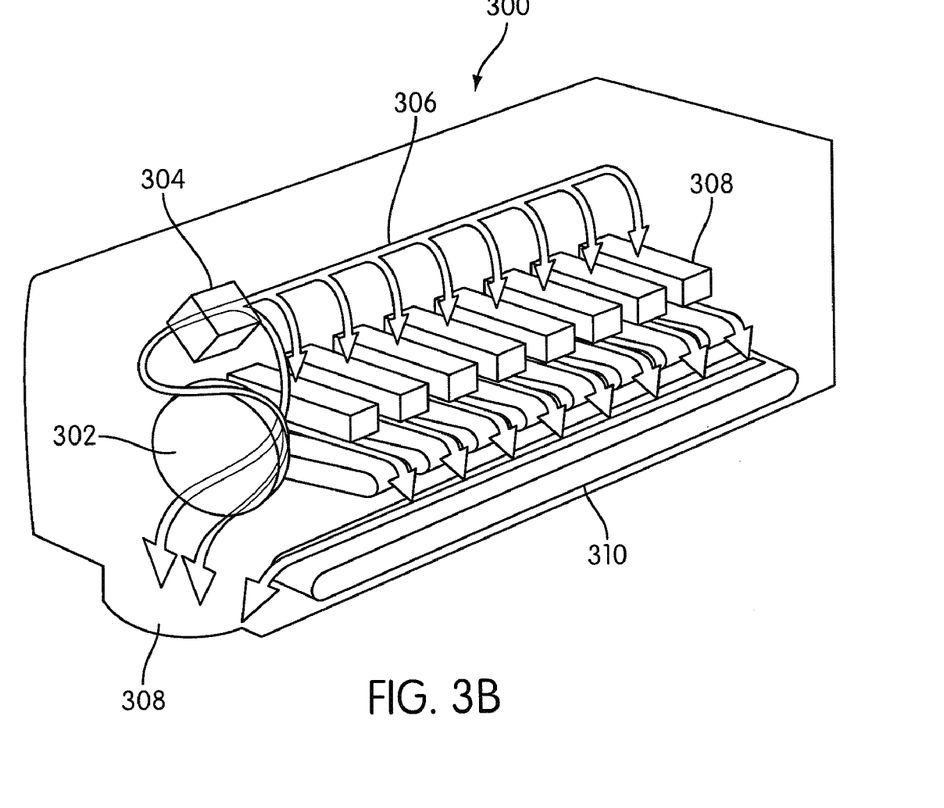
FIG. 3B illustrates the inner portion of a coin recycler such as shown in FIG. 3A.

FIGS. 3A-3B illustrate a sample coin recycler 300 that may be used in conjunction with the present invention. Suitable coin recyclers 300 may be obtained from Glory USA or other coin recycler manufacturers.

As illustrated in FIGS. 3A and 3B, coins may be input into a coin recycler 300 via a coin input opening 301. A feeding disc 302 may then route inputted coins past a recognition device 304 that may determine whether the input object is a coin or a foreign object and, if a coin, what value of coin it is. Foreign objects may be discarded through an exit 308. Legitimate input coins may be sorted via sorted mechanism 306 such that like coins are stored in the same stacker(s) 308. Coins may be dispensed as appropriate by discharging the coins from the stacker(s) 308 to a transport 310 and out through an exit 308.

As shown in FIG. 2, one or more coin recyclers 300 may be coupled to a cash handling device 200. For example, in one embodiment, a coin recycler 300 may be coupled to a cash handling device 200 in a retail back office. The coupling between the coin recycler and the cash handling device may be wired or wireless.

In an aspect of the invention, the cash handling device 200 may also be connected to a financial institution via communication network 120. This may enable the financial institution to monitor on a real time or periodic basis how much cash, currency, or coins are contained in the cash handling device 200.

Figure 4:
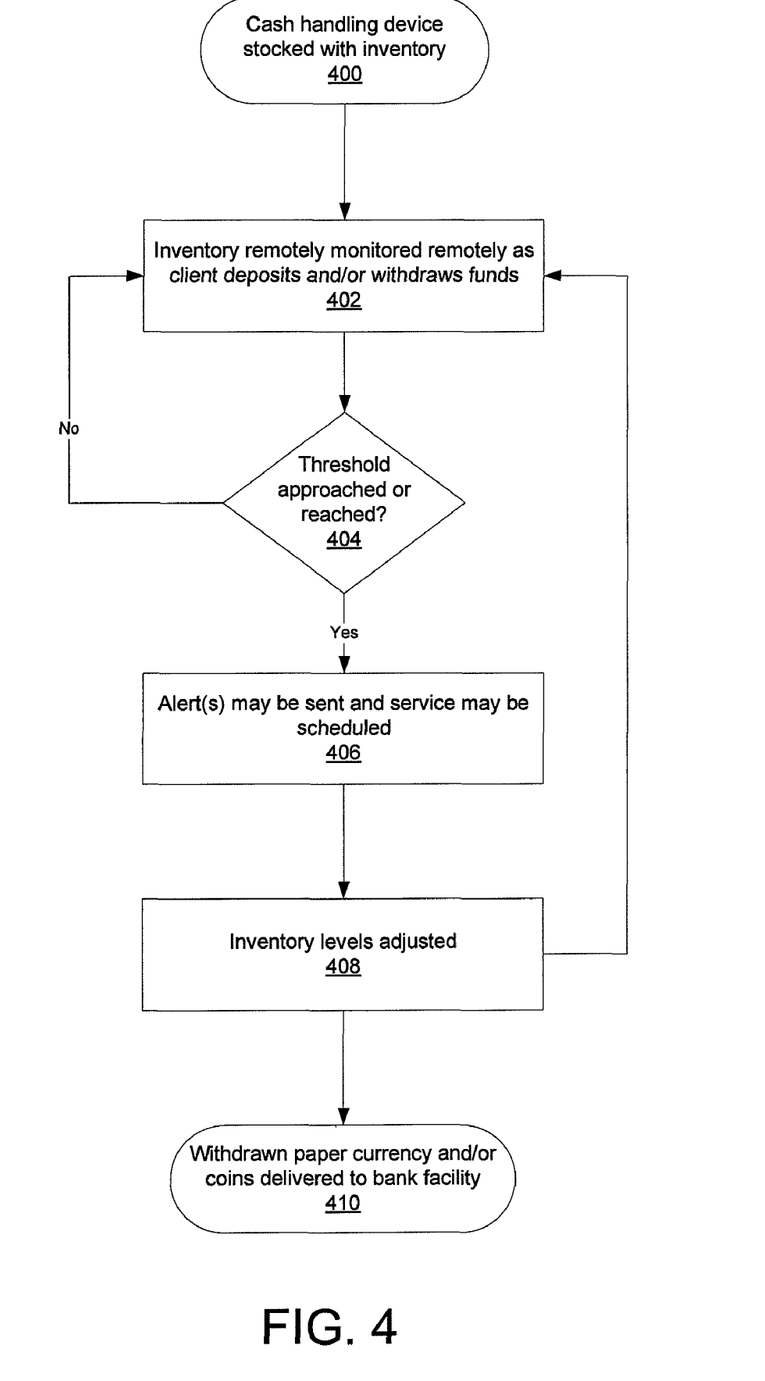
FIG. 4 illustrates an example method of monitoring inventory levels and dispatching armored service transport when appropriate.

FIG. 4 illustrates an example method of monitoring inventory levels and dispatching armored service transport when appropriate.

A cash handling device 200 is initially stocked with inventory. Each stacker 217 may be provided the ideal bill quantity for a given denomination or may be loaded with another predetermined quantity of bills.

Through the normal course of business, a client may deposit into and/or withdraw from the cash handling device 200 various amounts of paper and/or coin currency. This will cause the inventory of various denominations to rise and fall. A bank or other monitoring facility may monitor the inventory 402 on real time, on a periodic basis, or at other time intervals.

If a minimum or maximum threshold is reached or approached 404, one or more alerts may be sent and/or service may be scheduled 406. For example, an alert may be sent that requests withdrawal or replenishment of certain denominations. Alternatively or in addition, the alert may request or indicate that the quantity of one or more denominations may be adjusted to target level(s). The alert may be sent to any monitoring facility and/or to a transportation service. Servicing of the cash handling device may be scheduled automatically or manually 406.

Inventory levels may then be adjusted 408. In particular, change order(s) may be issued as a result of one or more alerts. The change order(s) may be delivered to a cash handling device by a transportation service. Change orders may be deposited to bring denominations that require replenishment to target or other appropriate levels. Similarly, withdrawals may be performed to decrease excess inventory to target or other appropriate levels.

Paper currency and/or coins that are removed from the cash handling device may be returned to a bank facility or other appropriate location 410. A bank or other monitoring facility may then continue to monitor the inventory 402 on real time, on a periodic basis, or at other time intervals.

In addition, inventory levels may be adjusted during any normal service visits by a transportation carrier as well.

Thus, the present invention enables inventory levels to be monitored in one or more cash handling devices and enables armored service for transport to be dispatched when: 1) the cash handling device requires replenishment for one or more denominations, 2) the inventory rises above or falls below desired thresholds, and/or 3) is approaching maximum capacity for one or more denominations.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method comprising:
   stocking a cash handling device with inventory;
   allowing transactions at the cash handling device;
   monitoring changes in the inventory in the cash handling device as a result of the transactions; and
   adjusting the inventory in the cash handling device responsive to at least one threshold for the inventory being reached,
   wherein the inventory is adjusted to a target level after said at least one threshold for the inventory is reached, and
   wherein said at least one threshold is a maximum threshold and indicates that at least one denomination is at or above a maximum desired level.

2. The method of claim 1 further comprising issuing at least one alert when said maximum threshold is reached.

3. The method of claim 2 wherein the changes in the inventory are monitored from a remote location through a communication network.

4. The method of claim 3 wherein the transactions include deposits to and withdrawals from the cash handling device.

5. The method of claim 3 wherein the inventory includes paper currency as well as coins.

6. A method comprising:
   stocking a plurality of cash handling devices with inventory of a plurality of denominations of currency;
   allowing deposits to and withdrawals from the cash handling devices;
   monitoring from a remote location changes in the inventory in the cash handling devices as a result of the deposits and the withdrawals;
   issuing an alert for one of said plurality of cash handling devices if either a minimum threshold is reached or a maximum threshold is reached, said minimum threshold indicating that at least one of said denominations is at or below a minimum desired level, said maximum threshold indicating that at least one of said denominations is at or above a maximum desired level;
   dispatching a carrier to the cash handling device for which the alert was issued;
   replenishing, by the carrier, each said currency denomination that is below a target level; and
   withdrawing, by the carrier, each said currency denomination that is above a target level.

7. The method of claim 6, wherein the alerts are issued automatically by said plurality of cash handling devices.

8. The method of claim 6, wherein the carrier is scheduled automatically to be dispatched when the remote location receives said alert.

9. The method of claim 6, wherein the plurality of cash handling devices are cash recyclers.

10. The method of claim 9 wherein the currency includes paper money as well as coins and each of the cash recyclers include a coin recycler.

11. A system comprising:
    a plurality of cash recyclers, each said cash recycler including:
      a first processor for executing first computer-executable instructions;
      a first memory that stores the first computer-executable instructions;
      at least three stackers for storing currency, each said stacker holding different currency denominations;
      user input means for receiving user input to request a deposit or withdrawal;
      an input mechanism to receive said currency to be deposited;
      an output mechanism to dispense said currency to be withdrawn
      a scanner to scan said currency in order to determine its said currency denomination;
      a display for displaying messages in accordance with the first computer-executable instructions; and
      a first communication interface;
    wherein the first computer-executable instructions cause the cash recycler to:
      allow said currency to be deposited into the cash recycler after the input means receives said user input requesting said deposit;
      scan the deposited currency in order to determine its said denomination;
      route the deposited currency to one of said at least three stackers corresponding to the denomination;
      allow said currency to be withdrawn from the cash recycler after the input means receives said user input requesting said withdrawal;
      route the currency be withdrawn to the output mechanism;
      monitor whether the currency in any said stacker equals a maximum threshold;
      monitor whether the currency in any said stacker equals a minimum threshold;
      provide a notification through the first communication interface when said maximum threshold or said minimum threshold is reached for any said stacker;
    at least one server including:
      a second processor for executing second computer-executable instructions;
      a second memory that stores the second computer-executable instructions;
      a second communication interface in communication with said first communication interface;
    wherein the second computer-executable instructions cause said at least one server to:
      receive said notification through the second communication interface when said maximum threshold or said minimum threshold is reached for any said stacker in any said cash recycler; and
      schedule a carrier to service said cash recycler from which the notification was received to adjust the currency in each said stacker in the cash recycler to target levels.

12. The system of claim 11 wherein said at least one server automatically schedules the carrier to be dispatched when the notification is received.

13. The system of claim 12 wherein the currency includes paper money as well as coins and each of the cash recyclers include a coin recycler.

* * * * *